(12) United States Patent
Kim et al.

(10) Patent No.: US 7,620,301 B2
(45) Date of Patent: Nov. 17, 2009

(54) SYSTEM AND METHOD FOR RESUMING PLAYBACK

(75) Inventors: Mi Hyun Kim, Seoul (KR); Jea Yong Yoo, Seoul (KR); Byung Jin Kim, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 718 days.

(21) Appl. No.: 10/671,017

(22) Filed: Sep. 25, 2003

(65) Prior Publication Data

US 2004/0197083 A1    Oct. 7, 2004

(30) Foreign Application Priority Data

Apr. 4, 2003  (KR) .................. 10-2003-0021251

(51) Int. Cl.
*H04N 5/00* (2006.01)
*G11B 27/00* (2006.01)
*H04N 5/93* (2006.01)
*H04N 7/00* (2006.01)

(52) U.S. Cl. .................. 386/126; 386/55; 386/95; 386/125

(58) Field of Classification Search .............. 386/1, 386/45, 46, 125–126, 68, 55, 95
See application file for complete search history.

(56) References Cited

U.S. PATENT DOCUMENTS

| | | | |
|---|---|---|---|
| 5,521,898 A | 5/1996 | Ogasawara |
| 5,583,652 A | 12/1996 | Ware |
| 5,602,956 A | 2/1997 | Suzuki et al. |
| 5,630,006 A | 5/1997 | Hirayama et al. |
| 5,633,839 A | 5/1997 | Alexander et al. |
| 5,691,972 A | 11/1997 | Tsuga et al. |
| 5,734,788 A | 3/1998 | Nonomura et al. |
| 5,742,569 A | 4/1998 | Yamamoto et al. |
| 5,784,528 A | 7/1998 | Yamane et al. |
| 5,884,004 A | 3/1999 | Sato et al. |
| 5,913,010 A | 6/1999 | Kaneshige et al. |
| 5,917,781 A | 6/1999 | Kim et al. |

(Continued)

FOREIGN PATENT DOCUMENTS

CN    1163673 A    10/1997

(Continued)

OTHER PUBLICATIONS

Labarge, Ralph, "DVD Authoring & Production", CMP Books, pp. 185-220, CMP Media LLC, Lawrence, Kansas, US, XP002523445, 2001.

(Continued)

*Primary Examiner*—Thai Tran
*Assistant Examiner*—Daquan Zhao
(74) *Attorney, Agent, or Firm*—Birch, Stewart, Kolasch & Birch, LLP (57) ABSTRACT

In accordance with one embodiment of the invention, a recording medium comprises a first recording area for recording data streams of a title domain and menu domain, said title domain comprising a plurality of titles, and a second recording area for recording navigation information for control of reproduction of the data streams, wherein the navigation information in the second recording area comprises playback control information for designating a location in the title domain to be resumed.

6 Claims, 9 Drawing Sheets

U.S. PATENT DOCUMENTS

| | | | |
|---|---|---|---|
| 5,923,869 A | 7/1999 | Kashiwagi et al. | |
| 5,933,410 A | 8/1999 | Nakane et al. | |
| 5,953,290 A | 9/1999 | Fukuda et al. | |
| 5,999,694 A * | 12/1999 | Yasuda et al. | 386/70 |
| 5,999,698 A | 12/1999 | Nakai et al. | |
| 6,009,234 A | 12/1999 | Taira et al. | |
| 6,014,495 A | 1/2000 | Moriyama et al. | |
| 6,064,385 A | 5/2000 | Sturgeon et al. | |
| 6,064,796 A | 5/2000 | Nakamura et al. | |
| 6,067,400 A | 5/2000 | Saeki et al. | |
| 6,084,581 A | 7/2000 | Hunt | |
| 6,088,507 A * | 7/2000 | Yamauchi et al. | 386/95 |
| 6,097,676 A | 8/2000 | Fujinami et al. | |
| 6,118,927 A | 9/2000 | Kikuchi et al. | |
| 6,130,869 A | 10/2000 | Tokoro et al. | |
| 6,167,189 A | 12/2000 | Taira et al. | |
| 6,215,746 B1 | 4/2001 | Ando et al. | |
| 6,219,488 B1 | 4/2001 | Mori et al. | |
| 6,247,022 B1 | 6/2001 | Yankowski | |
| 6,285,825 B1 | 9/2001 | Miwa et al. | |
| 6,292,226 B1 | 9/2001 | Yamanaka et al. | |
| 6,308,005 B1 | 10/2001 | Ando et al. | |
| 6,321,027 B2 | 11/2001 | Honjo et al. | |
| 6,336,002 B1 | 1/2002 | Yamauchi et al. | |
| 6,356,971 B1 | 3/2002 | Katz et al. | |
| 6,360,055 B1 | 3/2002 | Kaneshige et al. | |
| 6,373,803 B2 | 4/2002 | Ando et al. | |
| 6,377,474 B1 | 4/2002 | Archambeault et al. | |
| 6,377,518 B1 | 4/2002 | Auwens et al. | |
| 6,377,747 B1 | 4/2002 | Murase et al. | |
| 6,381,404 B1 | 4/2002 | deCarmo | |
| 6,385,388 B1 | 5/2002 | Lewis et al. | |
| 6,392,969 B1 | 5/2002 | Heo et al. | |
| 6,393,430 B1 | 5/2002 | Van Ryzin | |
| 6,415,101 B1 | 7/2002 | deCarmo et al. | |
| 6,424,793 B1 | 7/2002 | Setogawa et al. | |
| 6,424,797 B1 | 7/2002 | Murase et al. | |
| 6,430,122 B1 * | 8/2002 | Hamada et al. | 369/30.36 |
| 6,532,334 B1 * | 3/2003 | Kikuchi et al. | 386/68 |
| 6,570,837 B1 | 5/2003 | Kikuchi et al. | |
| 6,580,870 B1 | 6/2003 | Kanazawa et al. | |
| 6,584,277 B2 | 6/2003 | Tsumagari et al. | |
| 6,615,192 B1 | 9/2003 | Tagawa et al. | |
| 6,647,496 B1 | 11/2003 | Tagawa et al. | |
| 6,700,839 B1 | 3/2004 | Auflick et al. | |
| 6,727,421 B2 | 4/2004 | Izawa et al. | |
| 6,763,345 B1 | 7/2004 | Hempleman et al. | |
| 6,766,103 B2 | 7/2004 | Kim et al. | |
| 6,782,192 B1 * | 8/2004 | Tanaka et al. | 386/125 |
| 6,795,499 B1 | 9/2004 | Kato et al. | |
| 6,798,981 B1 * | 9/2004 | Yamauchi et al. | 386/126 |
| 6,832,293 B1 | 12/2004 | Tagawa et al. | |
| 6,859,421 B2 | 2/2005 | Sawabe et al. | |
| 6,904,227 B1 | 6/2005 | Yamamoto et al. | |
| 6,912,218 B1 | 6/2005 | Jeon et al. | |
| 6,914,863 B2 * | 7/2005 | Ono | 369/53.12 |
| 6,965,727 B1 | 11/2005 | Sawabe et al. | |
| 6,999,674 B1 | 2/2006 | Hamada et al. | |
| 7,006,758 B1 | 2/2006 | Yamamoto et al. | |
| 7,050,384 B2 | 5/2006 | Sasaki et al. | |
| 7,065,287 B1 | 6/2006 | Heredia et al. | |
| 7,113,694 B2 * | 9/2006 | Kim et al. | 386/95 |
| 7,236,687 B2 | 6/2007 | Kato et al. | |
| 2001/0014070 A1 | 8/2001 | Ando et al. | |
| 2001/0026679 A1 | 10/2001 | Koshino et al. | |
| 2001/0030710 A1 | 10/2001 | Werner | |
| 2001/0036358 A1 | 11/2001 | Kim et al. | |
| 2001/0043790 A1 | 11/2001 | Saeki et al. | |
| 2001/0053280 A1 | 12/2001 | Yamauchi et al. | |
| 2002/0018416 A1 | 2/2002 | Heo | |
| 2002/0041557 A1 | 4/2002 | Heo | |
| 2002/0046328 A1 | 4/2002 | Okada | |
| 2002/0071351 A1 | 6/2002 | Hamada et al. | |
| 2002/0093556 A1 | 7/2002 | Ishizawa et al. | |
| 2002/0093886 A1 | 7/2002 | Ijichi et al. | |
| 2002/0106196 A1 | 8/2002 | Yamauchi et al. | |
| 2002/0126994 A1 | 9/2002 | Gunji et al. | |
| 2002/0129036 A1 | 9/2002 | Ho Yuen Lok et al. | |
| 2002/0135608 A1 | 9/2002 | Hamada et al. | |
| 2002/0145702 A1 | 10/2002 | Kato et al. | |
| 2002/0159368 A1 | 10/2002 | Noda et al. | |
| 2002/0177914 A1 | 11/2002 | Chase | |
| 2002/0180803 A1 | 12/2002 | Kaplan et al. | |
| 2003/0035681 A1 | 2/2003 | Ho | |
| 2003/0058948 A1 | 3/2003 | Kelly et al. | |
| 2003/0063528 A1 | 4/2003 | Ogikubo | |
| 2003/0103604 A1 | 6/2003 | Kato et al. | |
| 2003/0118327 A1 | 6/2003 | Um et al. | |
| 2003/0123346 A1 | 7/2003 | Ishii et al. | |
| 2003/0123845 A1 | 7/2003 | Koda et al. | |
| 2003/0147322 A1 | 8/2003 | Ono | |
| 2003/0161615 A1 * | 8/2003 | Tsumagari et al. | 386/95 |
| 2003/0235404 A1 | 12/2003 | Seo et al. | |
| 2004/0014136 A1 | 1/2004 | Ishii et al. | |
| 2004/0019396 A1 | 1/2004 | McMahon et al. | |
| 2004/0047588 A1 * | 3/2004 | Okada et al. | 386/46 |
| 2004/0047591 A1 | 3/2004 | Seo et al. | |
| 2004/0076402 A1 | 4/2004 | Jung et al. | |
| 2004/0114908 A1 | 6/2004 | Ito | |
| 2004/0156621 A1 | 8/2004 | Seo et al. | |
| 2004/0208135 A1 | 10/2004 | Nakamura et al. | |
| 2004/0213105 A1 | 10/2004 | Seo et al. | |
| 2004/0220791 A1 | 11/2004 | Lamkin et al. | |
| 2005/0013590 A1 | 1/2005 | Ando et al. | |
| 2005/0019007 A1 | 1/2005 | Kato et al. | |
| 2005/0025459 A1 | 2/2005 | Kato et al. | |
| 2005/0036763 A1 | 2/2005 | Kato et al. | |
| 2006/0013564 A1 | 1/2006 | Hamada et al. | |
| 2006/0110132 A1 | 5/2006 | Takakuwa et al. | |
| 2006/0222340 A1 | 10/2006 | Yamauchi et al. | |

FOREIGN PATENT DOCUMENTS

| | | |
|---|---|---|
| CN | 1205793 A | 1/1999 |
| CN | 1212427 A | 3/1999 |
| CN | 1220458 A | 6/1999 |
| CN | 1239574 | 12/1999 |
| CN | 1251680 A | 4/2000 |
| CN | 1263345 A | 8/2000 |
| CN | 1272209 A | 11/2000 |
| CN | 1310445 A | 8/2001 |
| CN | 1317200 A | 10/2001 |
| CN | 1320926 A | 11/2001 |
| CN | 1346491 A | 4/2002 |
| CN | 1364387 A | 8/2002 |
| CN | 1383679 A | 12/2002 |
| CN | 1393872 A | 1/2003 |
| CN | 1509572 A | 6/2004 |
| CN | 1555058 A | 12/2004 |
| CN | 1571055 A | 1/2005 |
| CN | 1606355 A | 4/2005 |
| CN | 1606356 A | 4/2005 |
| CN | 1606357 A | 4/2005 |
| CN | 1611071 A | 4/2005 |
| EP | 0723216 A2 | 7/1996 |
| EP | 0724264 A2 | 7/1996 |
| EP | 0 737 009 A2 | 10/1996 |
| EP | 0737009 | 10/1996 |
| EP | 0831647 | 3/1998 |
| EP | 0836183 A2 | 4/1998 |
| EP | 0836189 A1 | 4/1998 |
| EP | 0858073 A1 | 8/1998 |
| EP | 0 872 839 A2 | 10/1998 |
| EP | 0872839 | 10/1998 |

| | | | | | | |
|---|---|---|---|---|---|---|
| EP | 0949622 A2 | 10/1999 | | JP | 3392838 | 1/2003 |
| EP | 1024494 A2 | 8/2000 | | JP | 3392849 | 1/2003 |
| EP | 1050880 | 11/2000 | | JP | 2003-068057 | 3/2003 |
| EP | 1 059 635 A | 12/2000 | | JP | 2003-199047 A | 7/2003 |
| EP | 1103974 A2 | 5/2001 | | JP | 2003-520514 A | 7/2003 |
| EP | 1126454 A1 | 8/2001 | | JP | 2005-513936 A | 5/2005 |
| EP | 1041565 B1 | 9/2001 | | JP | 2005-251392 | 9/2005 |
| EP | 1148503 A1 | 10/2001 | | KR | 1996-0038743 A | 11/1996 |
| EP | 1041569 B1 | 1/2002 | | KR | 1996-0038744 | 11/1996 |
| EP | 1198132 A1 | 4/2002 | | KR | 1996-0038901 A | 11/1996 |
| EP | 1198133 A1 | 4/2002 | | KR | 1996-0038905 A | 11/1996 |
| EP | 1 209 681 A | 5/2002 | | KR | 1999-022858 A | 3/1999 |
| EP | 1205933 | 5/2002 | | KR | 1999-0079482 A | 11/1999 |
| EP | 1271526 | 1/2003 | | KR | 2000-0053633 A | 8/2000 |
| EP | 1280348 A1 | 1/2003 | | KR | 2001-0022702 A | 3/2001 |
| EP | 1398965 A1 | 3/2004 | | KR | 2001-0028735 A | 4/2001 |
| EP | 1469677 A1 | 10/2004 | | KR | 2001-0051898 A | 6/2001 |
| EP | 1391119 B1 | 6/2006 | | KR | 2001-0098007 A | 11/2001 |
| JP | 3199711 A | 8/1991 | | KR | 2001-0107578 A | 12/2001 |
| JP | 8-273304 A | 10/1996 | | KR | 10-2002-0006273 | 1/2002 |
| JP | 9-135421 | 5/1997 | | KR | 1020020006273 | 1/2002 |
| JP | 10-032780 A | 2/1998 | | KR | 2002-0020919 A | 3/2002 |
| JP | 10-040667 A | 2/1998 | | KR | 2002-0097454 A | 12/2002 |
| JP | 11-069308 | 3/1999 | | KR | 2002-0097455 A | 12/2002 |
| JP | 11-069309 | 3/1999 | | RU | 2142167 C1 | 11/1999 |
| JP | 11-096653 | 4/1999 | | WO | WO-97/13366 A1 | 4/1997 |
| JP | 11-120747 A | 4/1999 | | WO | WO-97/14151 A1 | 4/1997 |
| JP | 11-161663 | 6/1999 | | WO | WO-97/15924 A1 | 5/1997 |
| JP | 11-213522 | 8/1999 | | WO | WO-97/37491 A1 | 10/1997 |
| JP | 11-213627 A | 8/1999 | | WO | WO-97/38527 | 10/1997 |
| JP | 11-259985 A | 9/1999 | | WO | WO-97/39451 A1 | 10/1997 |
| JP | 11-296997 A | 10/1999 | | WO | WO-99/08281 A1 | 2/1999 |
| JP | 2000-21130 A | 1/2000 | | WO | WO-99/38169 | 7/1999 |
| JP | 2000-67522 A | 3/2000 | | WO | WO-00/02195 A2 | 1/2000 |
| JP | 2000-149405 A | 5/2000 | | WO | WO-00/04726 A2 | 1/2000 |
| JP | 2000-195235 A | 7/2000 | | WO | WO-00/46803 | 8/2000 |
| JP | 2000-222822 A | 8/2000 | | WO | WO-00/60597 A1 | 10/2000 |
| JP | 2000-235779 A | 8/2000 | | WO | WO-01/35648 | 5/2001 |
| JP | 2000-235780 | 8/2000 | | WO | WO-01/52554 A1 | 7/2001 |
| JP | 2000-322827 A | 11/2000 | | WO | WO-01/82604 A1 | 11/2001 |
| JP | 2000-331466 A | 11/2000 | | WO | WO-01/82606 A1 | 11/2001 |
| JP | 2000-348442 A | 12/2000 | | WO | WO-01/82610 A1 | 11/2001 |
| JP | 2001-24985 A | 1/2001 | | WO | WO-02/075739 | 9/2002 |
| JP | 2001-157145 A | 6/2001 | | WO | WO-02/080541 A1 | 10/2002 |
| JP | 2001-157208 A | 6/2001 | | WO | WO-03/047261 A1 | 6/2003 |
| JP | 2001-169246 A | 6/2001 | | WO | WO-03/058957 A1 | 7/2003 |
| JP | 3199243 | 6/2001 | | WO | WO-2004/001728 A1 | 12/2003 |
| JP | 2001-195809 | 7/2001 | | WO | WO-2004/001750 A1 | 12/2003 |
| JP | 2001-332006 A | 11/2001 | | WO | WO-2004/001752 A1 | 12/2003 |
| JP | 2001-359072 A | 12/2001 | | WO | WO-2004/001753 A1 | 12/2003 |
| JP | 2002-025231 | 1/2002 | | WO | WO-2004/001754 A1 | 12/2003 |
| JP | 2002-82838 A | 3/2002 | | WO | WO-2004/032142 | 4/2004 |
| JP | 2002-83486 A | 3/2002 | | WO | WO-2004/047100 | 6/2004 |
| JP | 2002-112201 | 4/2002 | | WO | WO-2004/074976 A2 | 9/2004 |
| JP | 2002-150685 A | 5/2002 | | WO | WO-2004/088661 | 10/2004 |
| JP | 2002-158972 A | 5/2002 | | | | |
| JP | 2002-158974 A | 5/2002 | | | | |
| JP | 2002-222581 A | 8/2002 | | | | |
| JP | 2002-288255 | 10/2002 | | | | |
| JP | 2002-352515 | 12/2002 | | | | |
| JP | 3379961 | 12/2002 | | | | |

OTHER PUBLICATIONS

Search Report by Russian Patent Office, dated Jun. 29, 2009, 9 pgs.

* cited by examiner

System Parameters (SPRMs)

| SPRM | Meaning |
|---|---|
| 0 | Menu Description Language Code (M_LCD) |
| 1 | Audio stream number (ASTN) for TT_DOM |
| 2 | Sub-picture stream number (SPSTN) and On/Off flag for TT_DOM |
| 3 | Angle number(AGLN) for TT_DOM |
| 4 | Title number (TTN) for TT_DOM |
| 5 | VTS Title PGC number (VTS_TTN) for TT_DOM |
| 6 | Title PGC number (TT_PGCN) for TT_DOM |
| 7 | Part_of_Title number (PTTN) for One_Sequential_PGC_Title |
| 8 | Highlighted Button number (HL_BTN) for Selection state |
| ⋮ | ⋮ |
| 20 | Player Region Code |
| 21 | reserved |
| 22 | reserved |
| 23 | reserved for extended playback mode |

System Parameters (SPRMs)

| SPRM | Meaning |
|---|---|
| 0 | Menu Description Language Code (M_LCD) |
| 1 | Audio stream number (ASTN) for TT_DOM |
| 2 | Sub-picture stream number (SPSTN) and On/Off flag for TT_DOM |
| 3 | Angle number(AGLN) for TT_DOM |
| 4 | Title number (TTN) for TT_DOM |
| 5 | VTS Title PGC number (VTS_TTN) for TT_DOM |
| 6 | Title PGC number (TT_PGCN) for TT_DOM |
| 7 | Part_of_Title number (PTTN) for One_Sequential_PGC_Title |
| 8 | Highlighted Button number (HL_BTN) for Selection state |
| ⋮ | ⋮ |
| 20 | Player Region Code |
| 21 | Title cell number(TT_CellN) for TT_DOM |
| 22 | VTSN |
| 23 | NV_PCK start address for TT_DOM |
| 24 | PGC playback control status |
| 25 | Resumable flag |

SYSTEM AND METHOD FOR RESUMING PLAYBACK

CROSS-REFERENCE TO RELATED APPLICATIONS

Pursuant to 35 U.S.C. § 119(a), this application claims the benefit of earlier filing date and right of Korean Patent Application No. 10-2003-21251, filed on Apr. 4, 2003, the content of which is hereby incorporated by reference herein in its entirety.

BACKGROUND OF THE INVENTION

1. Field of the Invention

The present invention relates to a recording medium for recording data streams. A title domain, menu domain and navigation information for control of reproduction of data streams are provided to control playback of a title from a preselected resume position.

2. Description of the Related Art

An optical disk is capable of storing video data with a high-quality picture and audio data with high-quality sound thereon. A digital versatile disk (DVD) is an example of such optical disk. An optical disk apparatus, such as a DVD player, is capable of reproducing data streams recorded on the DVD and is widely commercially available.

Figure 1:
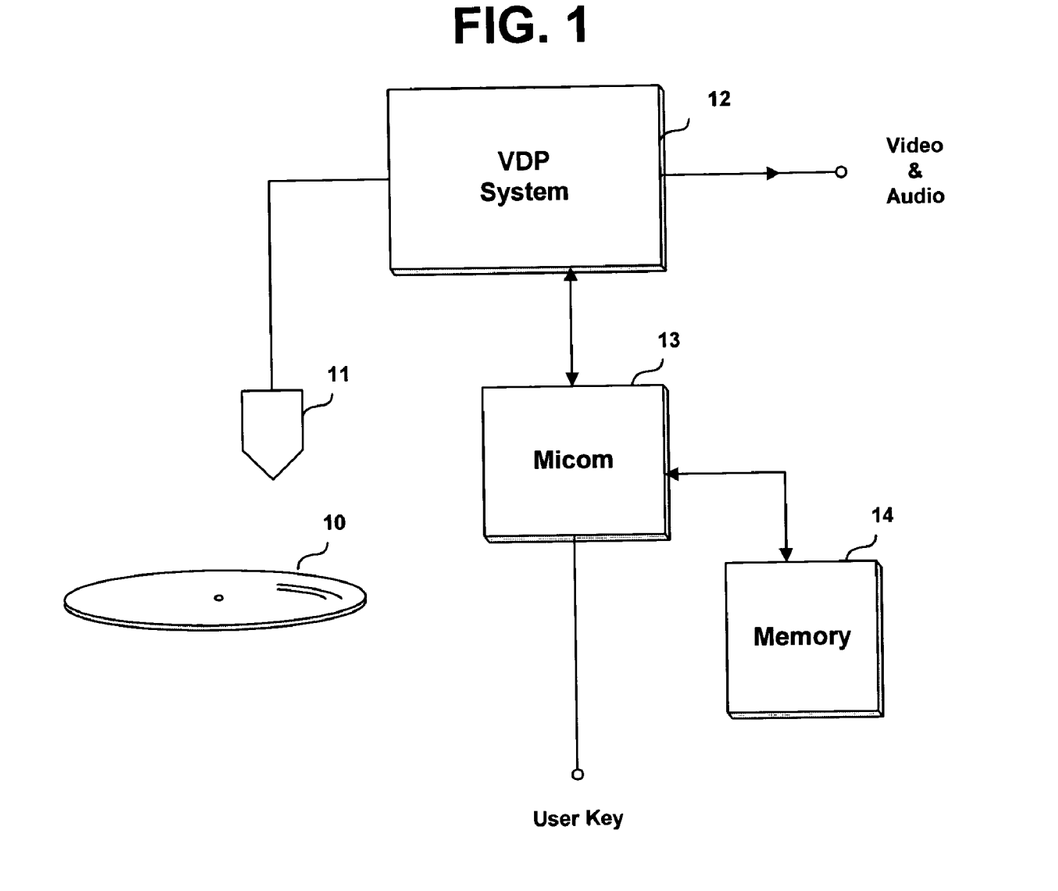
FIG. 1 is a block diagram of an optical disk apparatus, in accordance with one or more embodiments.

An exemplary embodiment of such an optical disk apparatus is illustrated in FIG. 1. The optical disk apparatus comprises an optical pickup 11, a video disk play (VDP) system 12, a processor 13 and a memory 14. The processor 13 controls the operation of the VDP system 12 in response to a user's request to play an optical disk 10 loaded in the apparatus. Recorded on the optical disk, (e.g., the DVD), are data streams of a title domain and menu domain. Navigation information for control of reproduction of the data streams are also recorded thereon.

Figure 2:
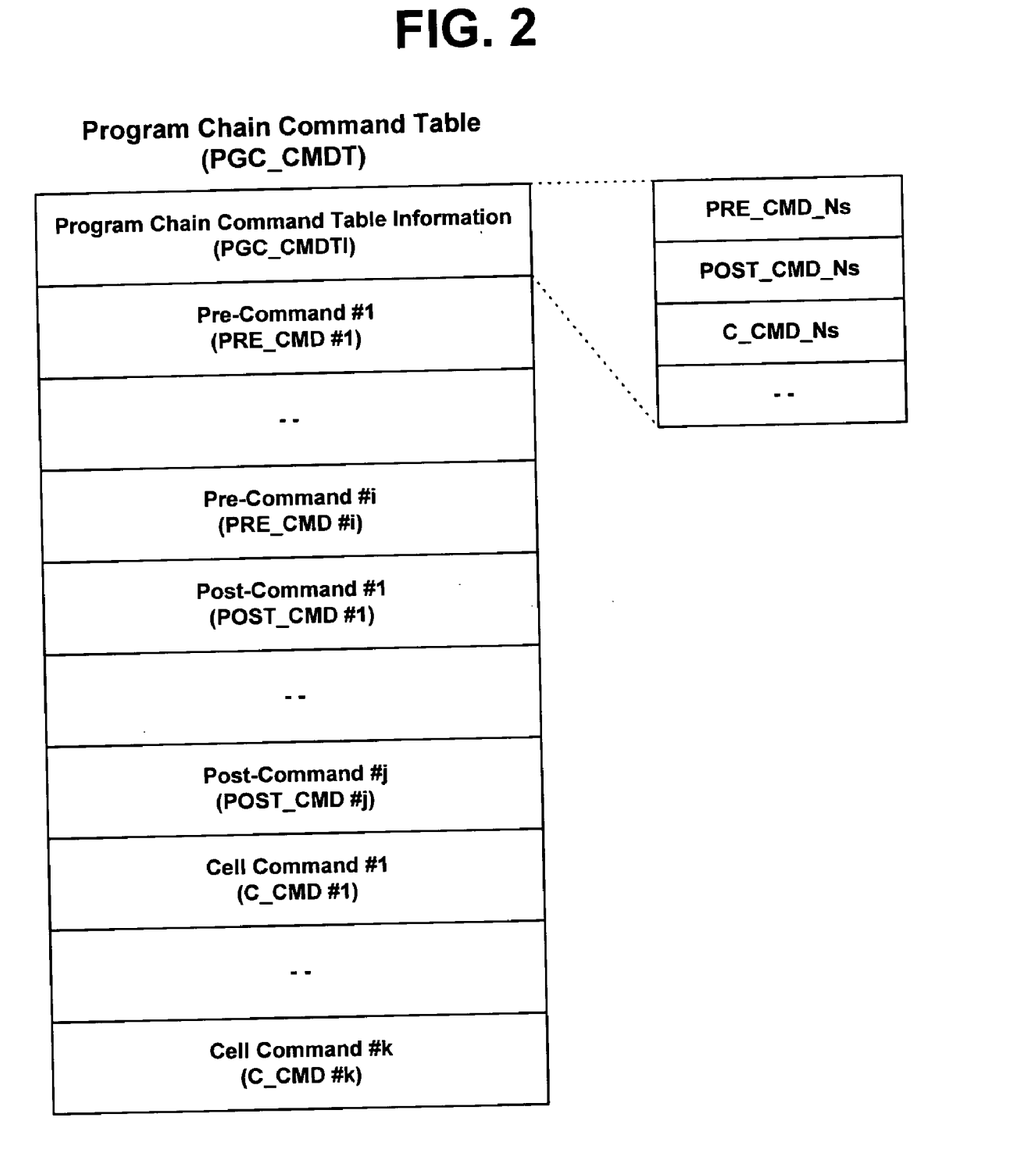
FIG. 2 is an exemplary program chain command table of a DVD.

Referring to FIG. 2, the navigation information includes program chain command table information (PGC_CMDTI), a plurality of pre-commands (PRE_CMD#1-PRE_CMD#i), a plurality of post-commands (POST_CMD#1-POST_CMD#j) and a plurality of cell commands (C_CMD#1-C_CMD#k), which are recorded and managed in a program chain command table (PGC_CMDT).

Figure 3:
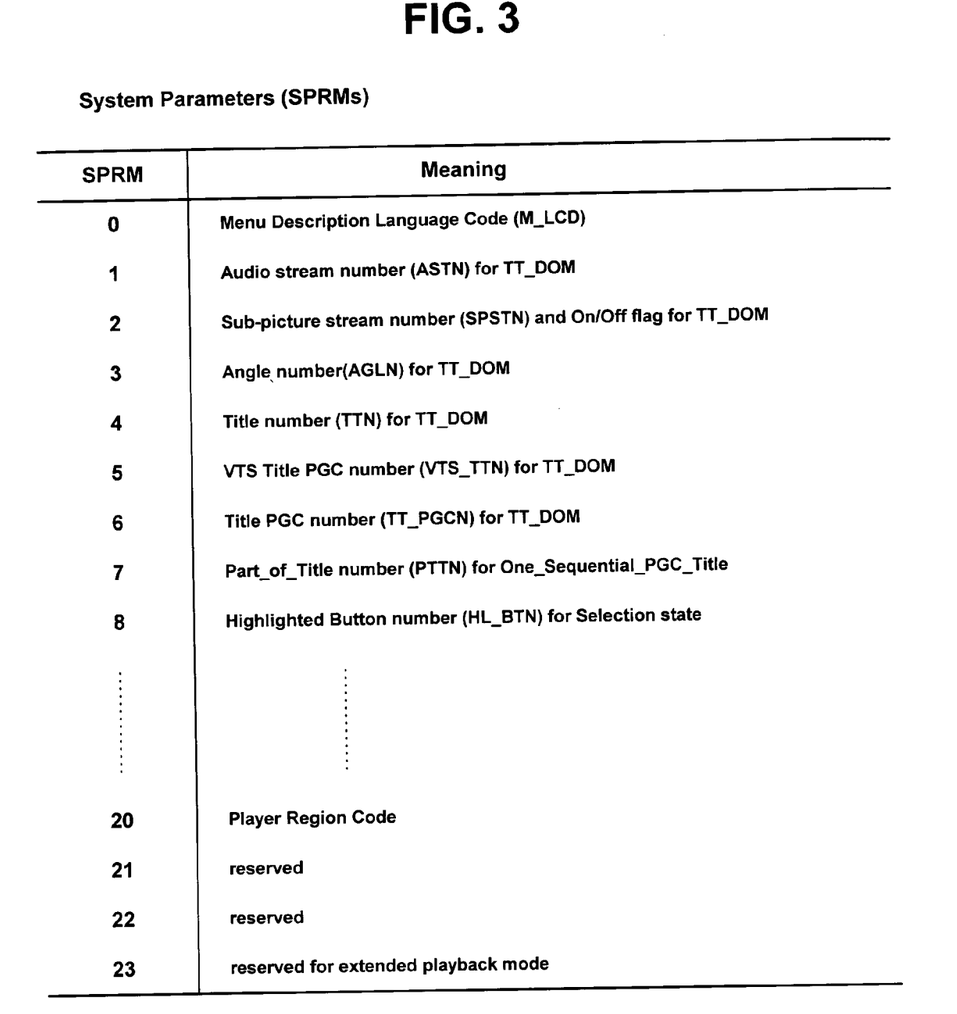
FIG. 3 illustrates system parameters of a DVD.

The program chain command table information PGC_CMDTI includes information PRE_CMD_Ns about the number of the pre-commands, information POST_CMD_Ns about the number of the post-commands and information C_CMD_Ns about the number of the cell commands. The title domain includes a plurality of titles, each of which has a plurality of system parameters SPRMs in which 24 information recording fields 0 to 23 SPRM0-SPRM23 are respectively assigned as shown in FIG. 3.

A title number for the title domain is recorded in the field 4 SPRM4. A video title set title program chain number for the title domain is recorded in the field 5 SPRM5. A title program chain number for the title domain is recorded in the field 6 SPRM6. A part-of-title number for one sequential program chain title is recorded in the field 7 SPRM7. A highlighted button number for a selection state is recorded in the field 8 SPRM8. The information recording fields 21 to 23 SPRM21-SPRM23 are reserved.

The optical disk apparatus performs a series of data reproduction operations corresponding to the user's request by searching for and referring to the navigation information recorded and managed in the above-mentioned manner. An optical disk system for recording data streams of a title domain with a main title and bonus video titles and data streams in a menu domain including a root menu is needed to support various contents, such as games. An efficient resume function for seeking and playing a predetermined position of a specific title when a playback operation is returned from the menu domain to the title domain is also needed.

SUMMARY OF THE INVENTION

In accordance with one embodiment of the invention, a recording medium comprises a first recording area for recording data streams of a title domain and menu domain, said title domain comprising a plurality of titles; and a second recording area for recording navigation information for control of reproduction of the data streams, wherein the navigation information in the second recording area comprises playback control information for designating a location in the title domain to be resumed.

The playback operation is resumed from the menu domain to the title domain and the navigation information further comprises a resume command for resuming the playback operation to the title, and wherein the resume command is recorded and managed in a program chain command table, command information about number of resume commands. The command information is recorded and managed in said program chain command table.

The title may comprises a plurality of system parameters, in certain embodiments. The system parameters comprise identification information indicating that the title is resumable. At least a second title in said title domain comprises a plurality of system parameters. The system parameters of the second title comprises identification information indicating that the second title is nonresumable. The system parameters are assigned values associated with at least one of a title cell number, a video title set number, a navigation pack start address and program chain playback control status information, for example.

A method for controlling playback of audio/video data recorded on a recording medium is provided, in accordance with one embodiment. The method comprises searching for and confirming first playback control information for designating a first title in a title domain having system parameters comprising identification information indicating that the first title is resumable, in response to a playback operation returning from a menu domain to the title domain, the title domain comprising a plurality of titles; and seeking and playing a first position of the first title corresponding to the first playback control information.

In some embodiments, the first playback control information comprises a title cell number, the first playback control information comprises a video title set number. The first playback control information comprises a navigation pack start address and comprises program chain playback control status information. The program chain playback control status information designates the first position of the first title.

In certain embodiments, the method further comprises updating the first playback control information with a second playback control information by execution of a program chain command of one of the plurality of titles in the title domain, played before data streams of the menu domain are reproduced. And, updating the first playback control information with a second playback control information for designating the first position of the resumable first title by execution of a program chain command.

In one or more embodiments, the first playback control information is updated with a second playback control information by execution of a program chain command of a menu in the menu domain played at a point of time that the playback operation is returned from the menu domain to the title domain. In some embodiments, the first playback control information is updated with a second playback control information for designating the first position of the first title by execution of a program chain command of the menu domain, if one of the plurality of titles in the title domain, played before data streams of the menu domain are reproduced, is nonresumable.

The identification information indicates if the first title is resumable, when the playback operation is returned from the menu domain to the title domain. The identification information is included in system parameters of each of the plurality of titles in the title domain. For example, the first recording area is a video recording area or a DVD-Video recording area. Further, the second recording area is a file structure recording area, for example.

In accordance with yet another embodiment, an optical recording medium comprises a DVD-Video recording area for recording data streams of a title domain and menu domain, the title domain comprising a plurality of titles; and a file structure recording area for recording playback information for controlling reproduction of the data streams, wherein said navigation information in the file structure recording area comprises at least a resume command for designating a title in the title domain, when a playback operation is returned from the menu domain to the title domain.

In other embodiments, a method of resuming playback of audio/video (A/V) data recorded on a recording medium is provided. The method comprises determining resumable status of a first title recorded on the recording medium, once playback of a bonus title associated with the first title is concluded; resuming playback of the first title if the resumable status is equal to a first value.

Playback of a second title is resumed, if the resumable status is equal to a second value. In one embodiment, the resuming step comprises determining a first playback location associated with the first title; and resuming playback from the first playback location. The first playback location is a associated with a location where the first title begins. Sometime, the first playback location is associated with a location other than where the first title begins.

The first playback location can be associated with a location where a second title begins. The first playback location is provided in a program chain command for the first title, for example, and is provided in a mapping table associated with a program chain command for the first title. A plurality of bonus titles may be associated with the first title, and wherein each of the plurality of bonus titles are associated with a respective resume command. Sometimes, in each respective resume command is associated with at least one parameter indicating whether the first title is resumable from the respective bonus title.

These and other embodiments of the present invention will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

Features, elements, and aspects of the invention that are referenced by the same numerals in different figures represent the same, equivalent, or similar features, elements, or aspects in accordance with one or more embodiments of the system.

DETAILED DESCRIPTION OF PREFERRED EMBODIMENTS

In accordance with one embodiment of the invention, data streams of a title domain such as a main title and bonus video titles, can be recorded on a recording medium, such as an optical disk or DVD. Data streams of a menu domain, including a root menu, are also recorded to support various contents such as games.

The present invention, in accordance with one or more embodiments is described, by way of example, as applicable to optical disk mediums, such as DVD or CD ROM. This application and exemplary embodiments, however, shall not be construed as limiting the scope of the invention to said recording mediums, only. The systems and methods disclosed herein may be used in conjunction and apply to any recording medium, such as a hard drive, magneto-optical or magnetic recording mediums, memory stick devices, and other functional equivalents.

Figure 4:
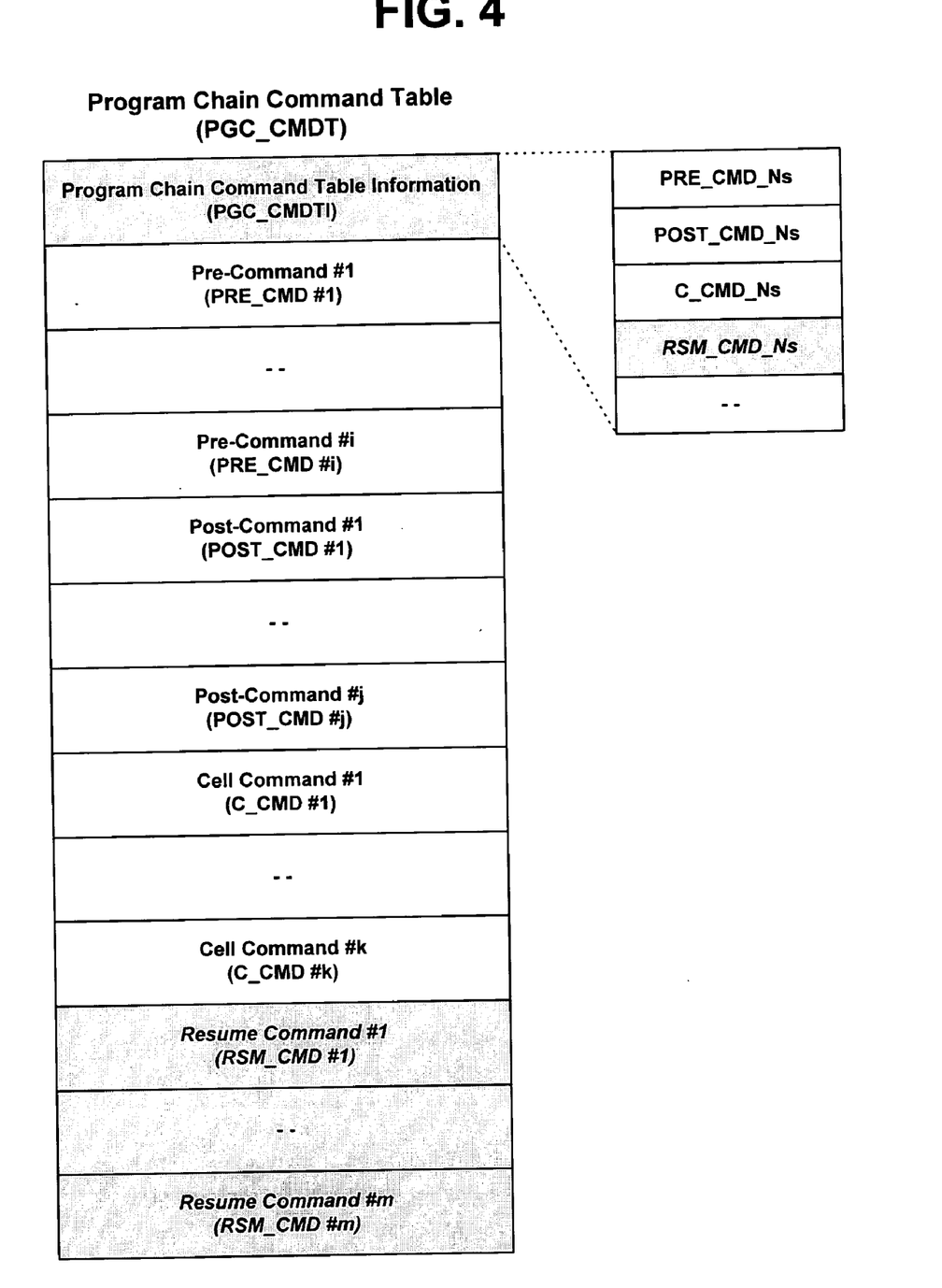
FIG. 4 illustrates a program chain command table of a recording medium, according to one embodiment of the present invention.

In accordance with one or more embodiments, navigation information for control of reproduction of the data streams are recorded on the optical disk. For example, as shown in FIG. 4, the navigation information may include program chain command table information PGC_CMDTI, a plurality of pre-commands PRE_CMD#1-PRE_CMD#i, a plurality of post-commands POST_CMD#1-POST_CMD#j and a plurality of cell commands C_CMD#1-C_CMD#k, which are recorded and managed in a program chain command table PGC_CMDT. According to one embodiment of the invention, the navigation information further comprises one or more resume commands RSM_CMD#1-RSM_CMD#k.

In certain embodiments these or other control information are also recorded and managed in the program chain command table PGC_CMDT or another equivalent data structure. Each resume command, for example, is an algorithm that indicates how playback will be resumed. The program chain command table information PGC_CMDTI may comprise information RSM_CMD_Ns indicating the number of the resume commands. Information PRE_CMD_Ns about the number of the pre-commands, information POST_CMD_Ns about the number of the post-commands and information C_CMD_Ns about the number of the cell commands may be also included, in some embodiments.

Figure 5:
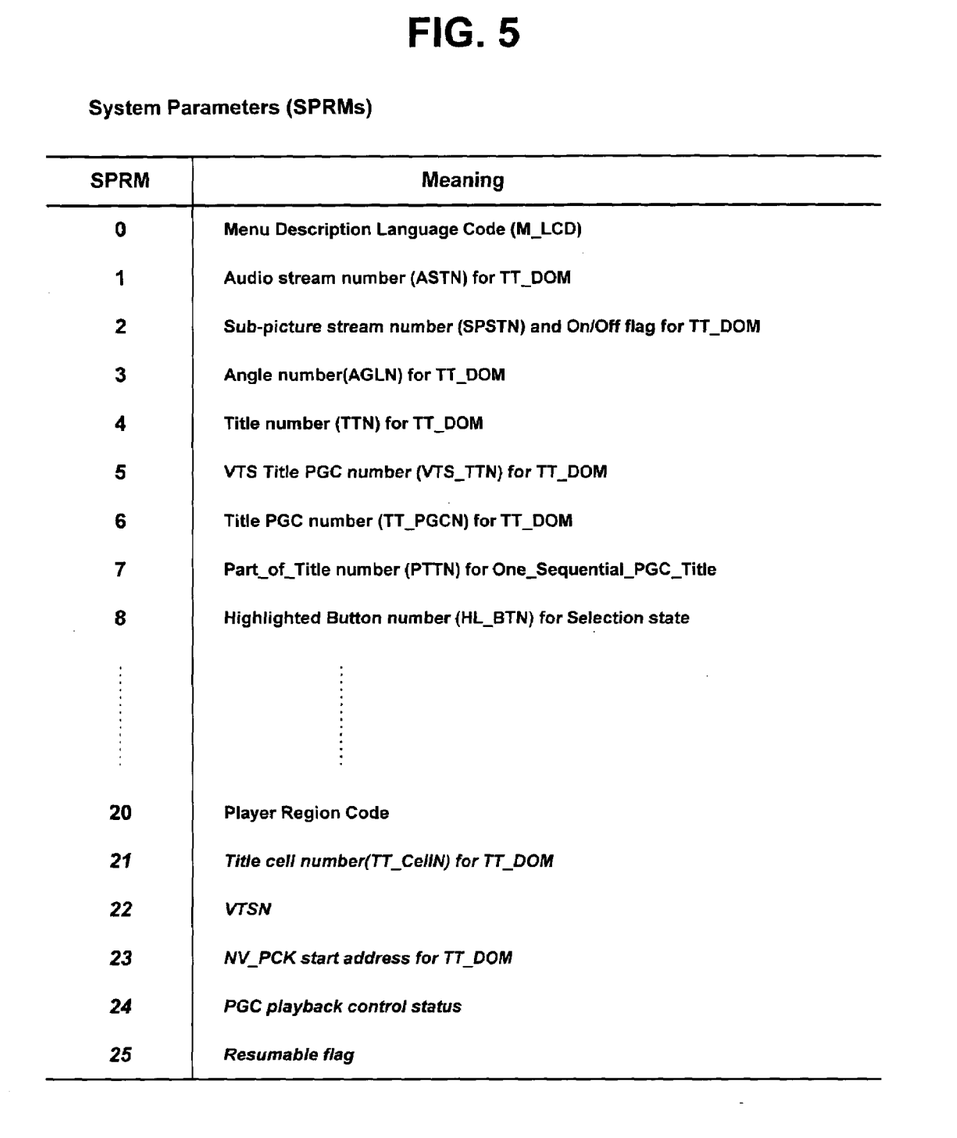
FIG. 5 illustrates exemplary system parameters of a recording medium according to one or more embodiments.

The title domain comprises a plurality of titles, each of which has a plurality of system parameters SPRMs in which, for example, 26 information recording fields 0 to 25 (SPRM0-

SPRM25) are respectively assigned, as shown in FIG. 5. A title number for the title domain is recorded in the field 4 SPRM4, for example. A video title set title program chain number for the title domain is recorded in the field 5 SPRM5, for example.

A title program chain number for the title domain is recorded in the field 6 SPRM6, a part-of-title number for one sequential program chain title is recorded in the field 7 SPRM7, and a highlighted button number for selection state is recorded in the field 8 SPRM8, for example, in one or more embodiments.

Recorded in the fields 21 to 25 (SPRM21-SPRM25) is playback control information for a resume function. The resume function may be for seeking and playing a predetermined position of a specific title when a playback operation is returned from the menu domain to the title domain during execution.

For example, a title cell number for the title domain may be recorded in the field 21 (SPRM21), a video title set number in the field 22 (SPRM22), a navigation pack start address for the title domain in the field 23 (SPRM23), and program chain playback control status information in the field 24 (SPRM24).

In one embodiment, the field 25 (SPRM25) comprises a resumable flag indicative of whether the corresponding title is resumable. For example, in the case where the flag is set to '1', it indicates that the corresponding title may be selected or played when the playback operation is returned from the menu domain to the title domain. Alternatively, in the case where the flag is set to '0', it indicates that the corresponding title may not be selected or played when the playback operation is returned from the menu domain to the title domain. In certain embodiments, if the flag indicates that the title is resumable, then the playback control information stored in the fields 21 to 25 is not changed or set. In other embodiments, the playback control information is modified in accordance with whether the title is resumable or not.

Now, a method for controlling playback of the optical disk based on the resume function is provided. The resume function is for seeking and playing a predetermined position of a specific title when the playback operation is returned from the menu domain to the title domain during its execution. The resume function references playback control information recorded in the program chain command table PGC_CMDT and the playback control information recorded in the information recording fields.

The optical disk playback control method according to the present invention can be applied to a general optical disk apparatus or the exemplary optical disk player apparatus of FIG. 1. In one embodiment, the optical disk apparatus may play a bonus video title in response to a user's request or on the basis of navigation information. The playback may take place in the middle of playback of a movie of the main title, for example. The resumable flag in the field 25 (SPRM25), among the system parameters of the main title, can be set to indicate that the main title is resumable or not.

Figure 6:
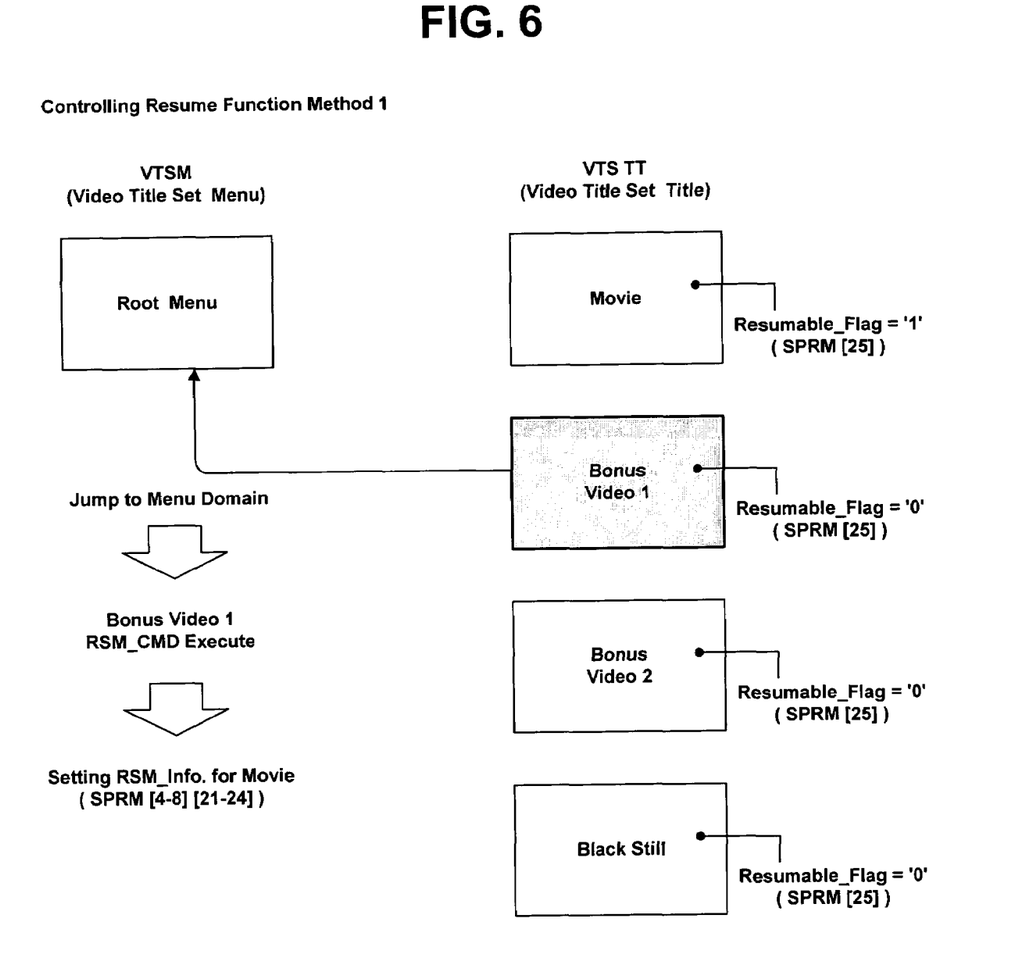
FIGS. 6 and 7 illustrate a method for controlling playback of the recording medium content according to one or more embodiments.
Figure 7:
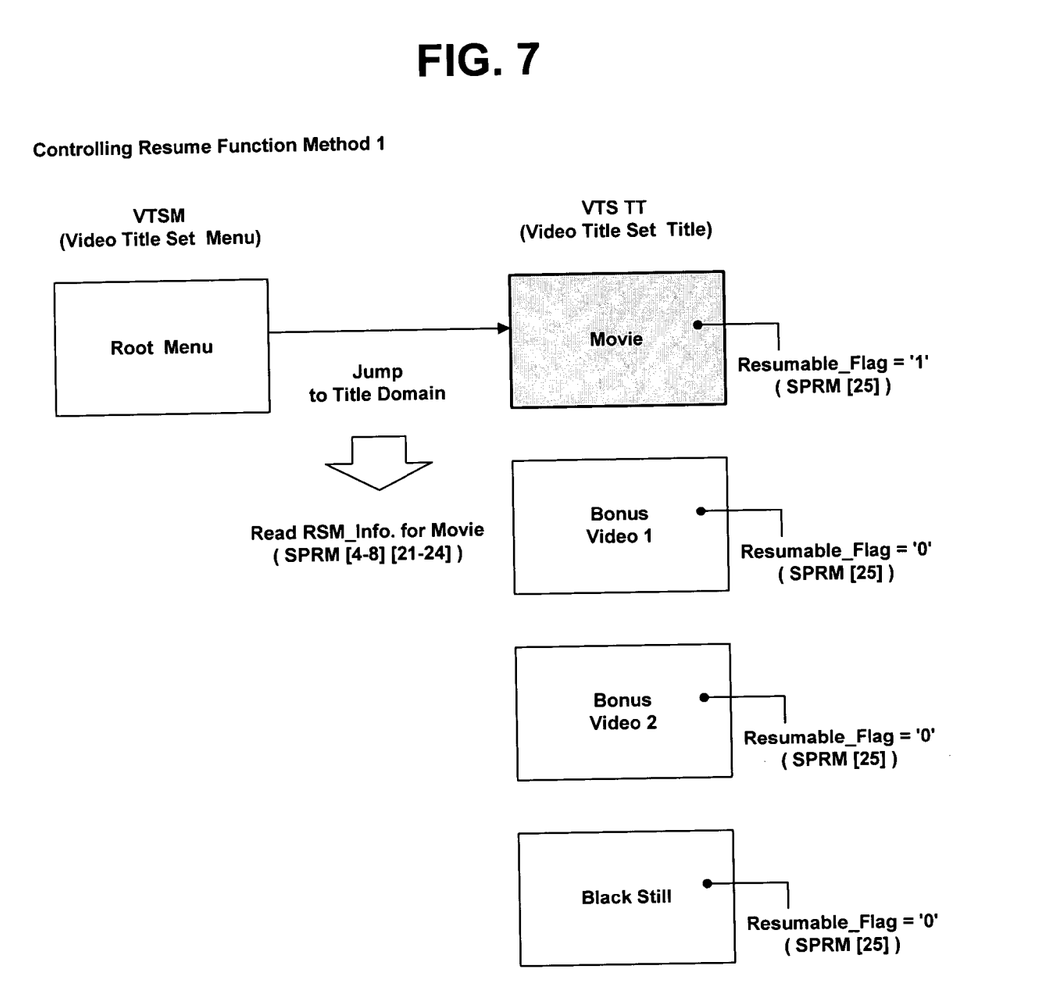
Figure 8:
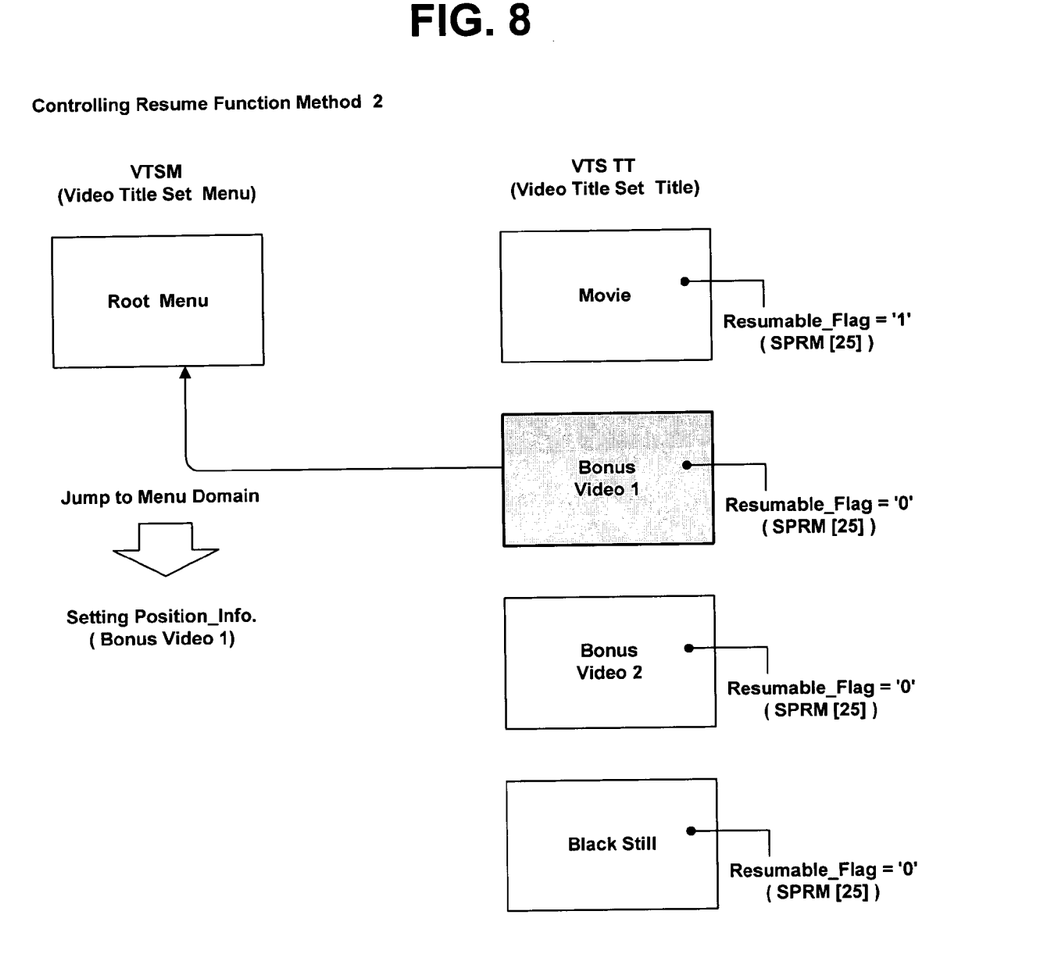
FIGS. 8 and 9 illustrate an alternative method for controlling playback of the recording medium content according to another embodiment.
Figure 9:
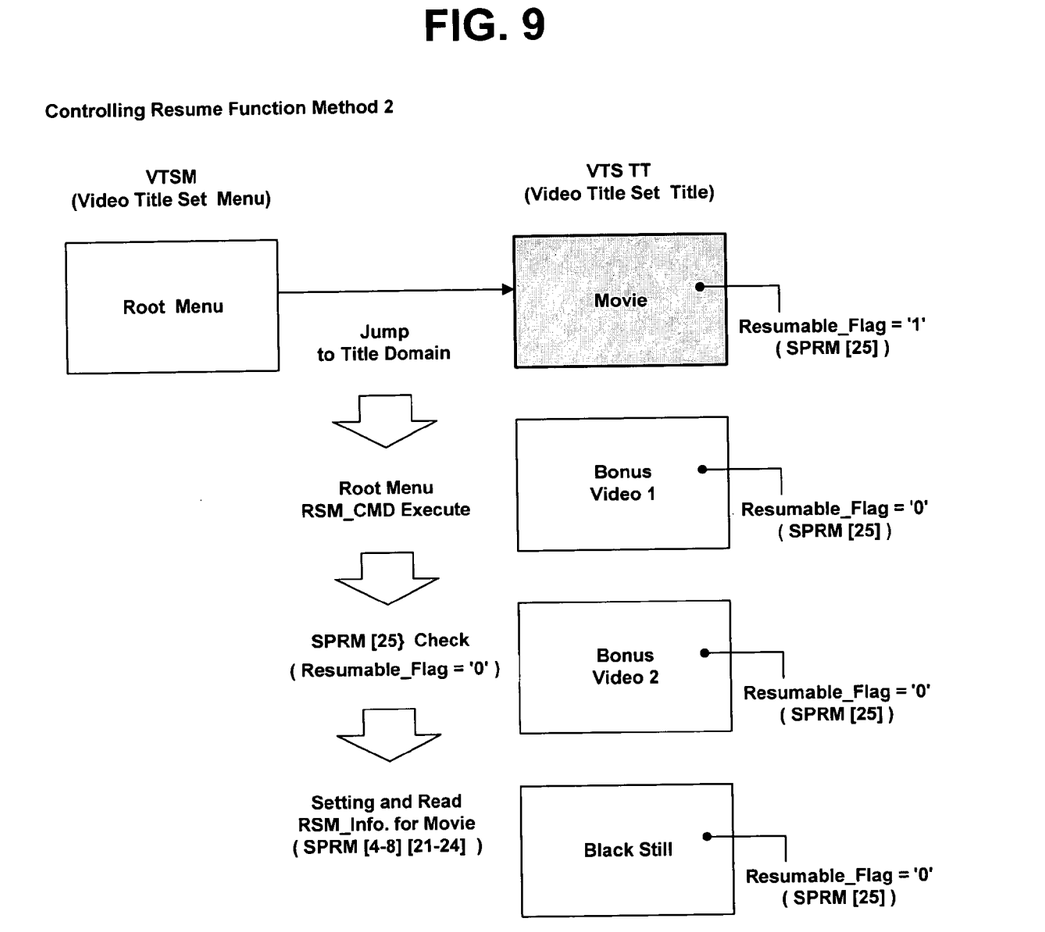

Referring to FIG. 6, the resumable flag is set to '0' to indicate that a first bonus video title is nonresumable. The optical disk apparatus may jump to the root menu in the menu domain of the optical disk to play it in response to a user's request. In this case, a resume command Bonus Video1 RSM_CMD of the first bonus video title is executed. At this time, for its returning from the menu domain to the title domain, the optical disk apparatus sets and stores a predetermined position of a specific title, for example, the main title with its flag set to '1' as resume information, RSM_Info. for Movie, therein.

That is, when a user jumps from the first bonus video title to the root menu, the system parameters in the fields 4 to 8 (SPRM4-SPRM8) and the fields 21 to 24 (SPRM21-SPRM24) of the main title, for example, are stored in the optical disk apparatus as resume information RSM_Info. for designating the predetermined position of the main title.

If the user selects a resume button during the playback of the root menu, then the optical disk apparatus performs a playback control operation based on the resume function of seeking and playing the predetermined position of the main title designated by the stored resume information, by searching for and referring to those system parameters. Accordingly, when the resume function is performed from the root menu to the title domain, the playback operation causes the system to jump, not to the first bonus video title, but directly to the predetermined position of the main title corresponding to the resume information stored by execution of the resume command of the first bonus video title. Therefore, the optical disk apparatus can rapidly play the predetermined position of the main title, such as a movie.

In an alternative embodiment of the present invention, in the case where the optical disk apparatus jumps to the root menu in the menu domain of the optical disk in response to the user's request, information Position_Info about the current playback position of the first bonus video title is set and stored.

In some embodiments, if the user selects the resume button during the playback of the root menu, then the optical disk apparatus executes a resume command (Root Menu RSM_CMD) of the root menu. At this time, the optical disk apparatus checks the resumable flag in the field 25 (SPRM25), among the system parameters of the first bonus video title corresponding to the position information.

If the checked flag indicates that the first bonus video title is nonresumable, the system parameters in the fields 4 to 8 (SPRM4-SPRM8) and the fields 21 to 24 (SPRM21-SPRM24) of the main title are set and stored as resume information for designation of a predetermined position of the main title by execution of the resume command of the root menu.

The optical disk apparatus then performs a playback control operation based on the resume function of seeking and playing the predetermined position of the main title designated by the set resume information. As a result, the resume function is performed from the root menu to the title domain. And, the playback operation starts not from the first bonus video title, but directly from the predetermined position of the main title. As such, the optical disk apparatus can quickly play the predetermined position of the main title, such as a movie.

The present invention provides an optical disk and a method for controlling playback thereof, wherein a content provider that provides various contents, such as games, can efficiently provide titles with various scenarios by designating the titles as resumable or nonresumable. When a resume operation is performed, an optical disk apparatus can more rapidly play a predetermined position of a specific title, such as a movie.

The embodiments described above are to be considered in all aspects as illustrative only and not restrictive in any manner. Thus, other exemplary embodiments, system architectures, platforms, and implementations that can support various aspects of the invention may be utilized without departing from the essential characteristics described herein. These and various other adaptations and combinations of features of the embodiments disclosed are within the scope of the invention. The invention is defined by the claims and their full scope of equivalents.

What is claimed is:

1. A method of controlling resume-playback of one or more titles recorded on a recording medium, comprising:
   reproducing a first title;
   receiving a user input for playback of a second title;
   storing resume information of the first title in a storing unit of apparatus according to a first resumable flag which indicates whether the first title is resumable or not;
   reproducing the second title according to the user input for playback of the second title;
   receiving a user input for resuming playback of the first title; and
   resuming playback of the first title based on the resume information of the first title by executing a resume command, the resume command being contained in a command group of the recording medium,
   wherein the resume information of the first title includes;
   resume position information being used to represent resuming playback position of the first title;
   title number of the first title; and
   highlighted button number for selection state.

2. The method of claim 1, wherein the first title is a main title, and the second title is a menu title.

3. An apparatus of controlling resume-playback of one or more titles recorded on a recording medium, comprising:
   a pick up unit configured to read/write data from/on the recording medium;
   a storing unit configured to store resume information; and
   a controller configured to
      control the pick up unit to reproduce a first title,
      receive a user input for playback of a second title,
      control the storing unit to store the resume information of the first title according to a first resumable flag which indicates whether the first title is resumable or not,
      control the pick up unit to reproduce the second title according to the user input,
      receive a user input for resuming the playback of the first title, and
      execute the resume command contained in a command group based on the resume information,
   wherein the resume information includes:
   resume position information being used to represent resuming playback position of the first title;
   title number of the first title; and
   highlighted button number for selection state.

4. The apparatus of claim 3, wherein the wherein the first title is a main title, and the second title is a menu title.

5. A recordable medium including video data and management information recorded by a recording device and configured to be reproduced by a reproducing device in a manner instructed by the management information, the recordable medium comprising:
   a first area configured to store data streams of one or more titles; and
   a second area configured to store one or more command groups for controlling a reproduction of the data streams of the one or more titles,
   wherein at least one command group contains a navigation command, the navigation command being used to instruct an apparatus to store resume information into a storing unit of the apparatus according to a resumable flag which indicates whether one of the titles is resumable or not, wherein the resume information includes:
   resume position information being used to represent resuming playback position of the one title;
   title number of the one title; and
   highlighted button number for selection state.

6. The recordable medium of claim 5, wherein the first area further stores a data stream associated with a menu domain.

* * * * *